April 14, 1931.                W. PFAB                1,800,748
                              INDICATOR
                         Filed Dec. 10, 1930

INVENTOR.
Walther Pfab
BY Max D. Ordmann
ATTORNEY

Patented Apr. 14, 1931

1,800,748

UNITED STATES PATENT OFFICE

WALTHER PFAB, OF BLOOMFIELD, NEW JERSEY

INDICATOR

Application filed December 10, 1930. Serial No. 501,310.

The present invention relates to a horizon or level indicator for use in aircraft or the like.

The principal object of my invention is to provide a device which will be independent of the speed of the craft and will accurately indicate to a pilot by a glance the angular position of his craft in any direction. Such device is of especial importance when flying through heavy fog or other low visibility areas.

A further object is to provide a very simply constructed effective device.

Still another object is to provide a device which may be simply and cheaply constructed.

With the above and other objects in view, my invention comprises the novel construction, combination and arrangement of parts to be hereinafter more fully described, shown and defined in the appended claims.

In the accompanying drawing in which similar reference characters denote corresponding parts;

Figure 1:
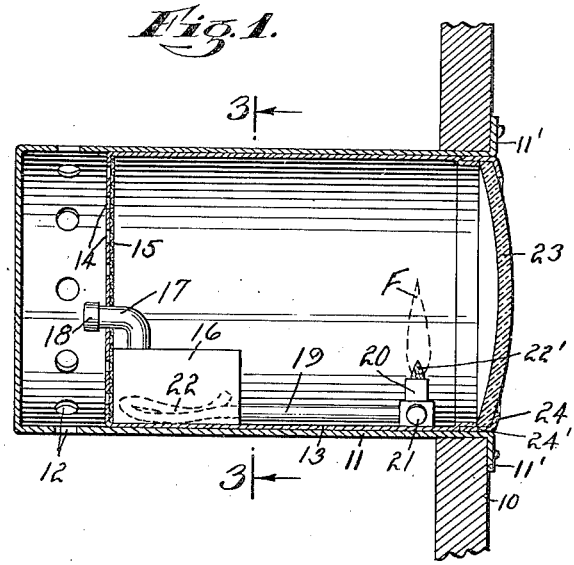
Fig. 1 is a sectional elevation of my device shown mounted to the instrument board of an air craft.
Figure 2:
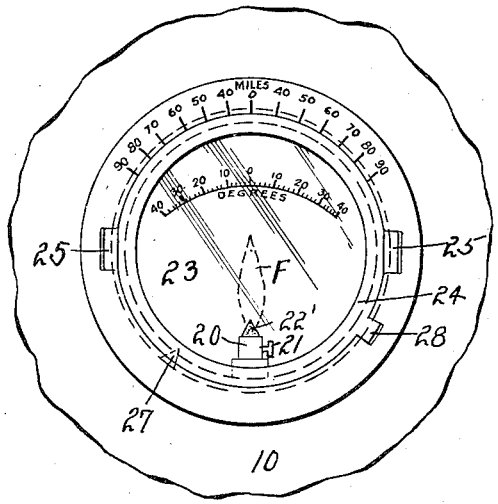
Fig. 2 is a front elevation showing the scale indicating the angular tilt, etc.
Figure 3:
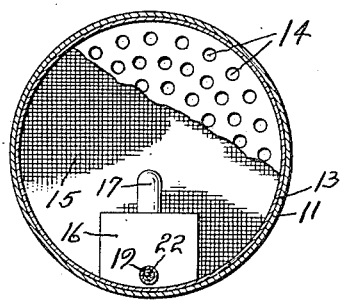
Fig. 3 is a section along line 3—3 of Fig. 1 seen in the direction of the arrows.

Referring to the drawing 10 may denote an instrument board to which may be suitably mounted an open front casing 11 provided with a plurality of perforations 12 on its side wall near its rear end and having a flange 11' at its front and which abuts said board 10 and may be fastened thereto.

Adapted to be mounted through the front open end of said casing 11 from in front of said board 10 is a second tubular casing 13 also open at its front end and and whose rear end is provided with a plurality of perforations 14. A screen 15 of copper wire or other suitable material is fitted over said perforations 14. Mounted inside said casing 13 is a fuel tank 16 having an outlet 17 projecting through the rear end of said casing and whose orifice is provided with a removable cap 18.

An outlet pipe 19 connects said tank with a vertically extending wick holder 20 which has mounted therein a wick feeder denoted diagrammatically at 21 and which latter may be of any well known type. A wick 22 so admeasured in length as to extend into said tank 16, through pipe 19 and emerge through the outlet of said holder 20 is provided. Said wick may be of any suitable material which will feed fuel from said tank to the tip 22' of said wick by capillary action or in any other way. In order to secure a pointed flame F the tip 22' of said wick may be conical in shape.

A removable transparent front cover 23 of glass, mica or the like is provided and which is adapted to be held in place by a suitable ring 24, a wall 24' of which may frictionally engage on a reduced portion 13' at the front end of casing 13. Said cover may be cemented to said ring or otherwise permanently fixed thereto. The face of cover 23 has marked thereon a scale having a zero mark. Marked to the right and left of said zero mark are a plurality of graduations which indicate angular tip in degrees to right or left of the vertical position.

Either marked on said cover 23 or on said flange 11' above said first named scale is another set of graduations also having a zero center mark with said first named center. Marked off on either side of said second zero center are a plurality of graduations marked in miles per hour.

The purpose of the scales is as follows:—

When the wick is lighted and is vertical the flame F projects vertically upward and points to said two zero marks. If the wick support however, is tilted either to the right or left the scales also tip. However, the flame remains vertical and its tip points to the graduations either to the right or left of said zero marks, indicating on the lower scale the angular tip in degrees. The upper scale is used by the pilot to determine what tip he shall give his plane in making a right or left turn when going forwardly at a known speed. For instance if he is going forwardly at 60 miles per hour and wishes to make a turn to the right or to the left he tips his craft in the proper direction until the flame points to the proper miles graduation on the upper scale. Then he can make a proper turn.

The scales shown in the drawing are only diagrammatic and do not indicate the exact graduation necessary.

The pilot can also readily tell by glancing at the flame F as to whether he is tipping forwardly or rearwardly as the cover will appear to slant toward the flame F if the craft is tipping forwardly and vice versa.

In order to remove the inner casing 13 to gain access to the inlet to the fuel tank, finger pieces 25 project from said casing 13 and serve as means to pull out the latter when necessary. A suitable setting pin 27 formed on the front part of the wall of casing 13 serves to always permit exact replacement of the front cover 23 after it has been removed to light the flame F.

To facilitate removal of said cover 23, to light the flame and feed the wick, ring 24 may have a finger gripper 28 attached thereto. Of course, if desired said ring 24 may be hingedly mounted to facilitate opening or any other method of removably mounting it may be employed.

The comparatively large surface of the two casings serves to dissipate the heat from said flame. However, if necessary suitable radiating ribs (not shown) or the like may be added to increase the heat radiation.

The air supply containing the oxygen which is necessary for the flame enters through perforations 12 and perforations 14. However, currents of air do not disturb the flame. Other suitable means for accomplishing this result may be employed.

Many modifications of my device may be made without departing from the spirit of the invention involved and I do not wish to be limited to the details shown and described.

What I claim is:—

1. An indicator comprising a scale and means for producing a flame to act as a pointer along said scale.

2. An indicator comprising a scale, means for producing a flame to act as a pointer along said scale and means for keeping said flame steady.

3. An indicator comprising a scale, means for producing a flame to act as a pointer along said scale and means for supplying air without disturbing the flame.

4. An indicator comprising an enclosure having a transparent wall, a scale on said wall, means in said enclosure for producing a flame and means for causing said flame to burn with a pointed tip, said tip to act as a pointer along said scale.

5. The combination with an air craft, of an indicator therein, comprising an enclosure having a transparent wall, a scale on said wall, means on said enclosure for producing a flame and means for causing said flame to burn with a pointed tip, said tip to act as pointer along said scale.

6. The combination with an aircraft, of an indicator therein, comprising superposed scales one indicating angular measure in degrees and the other miles per hour and means for producing a flame to act as a pointer along said scales.

In testimony whereof I affix my signature.

WALTHER PFAB.